Sept. 4, 1928.  
J. WHITE  
1,683,374  
DRIVING MECHANISM FOR PAPER AND OTHER MACHINES  
Filed Jan. 28, 1928   3 Sheets-Sheet 1
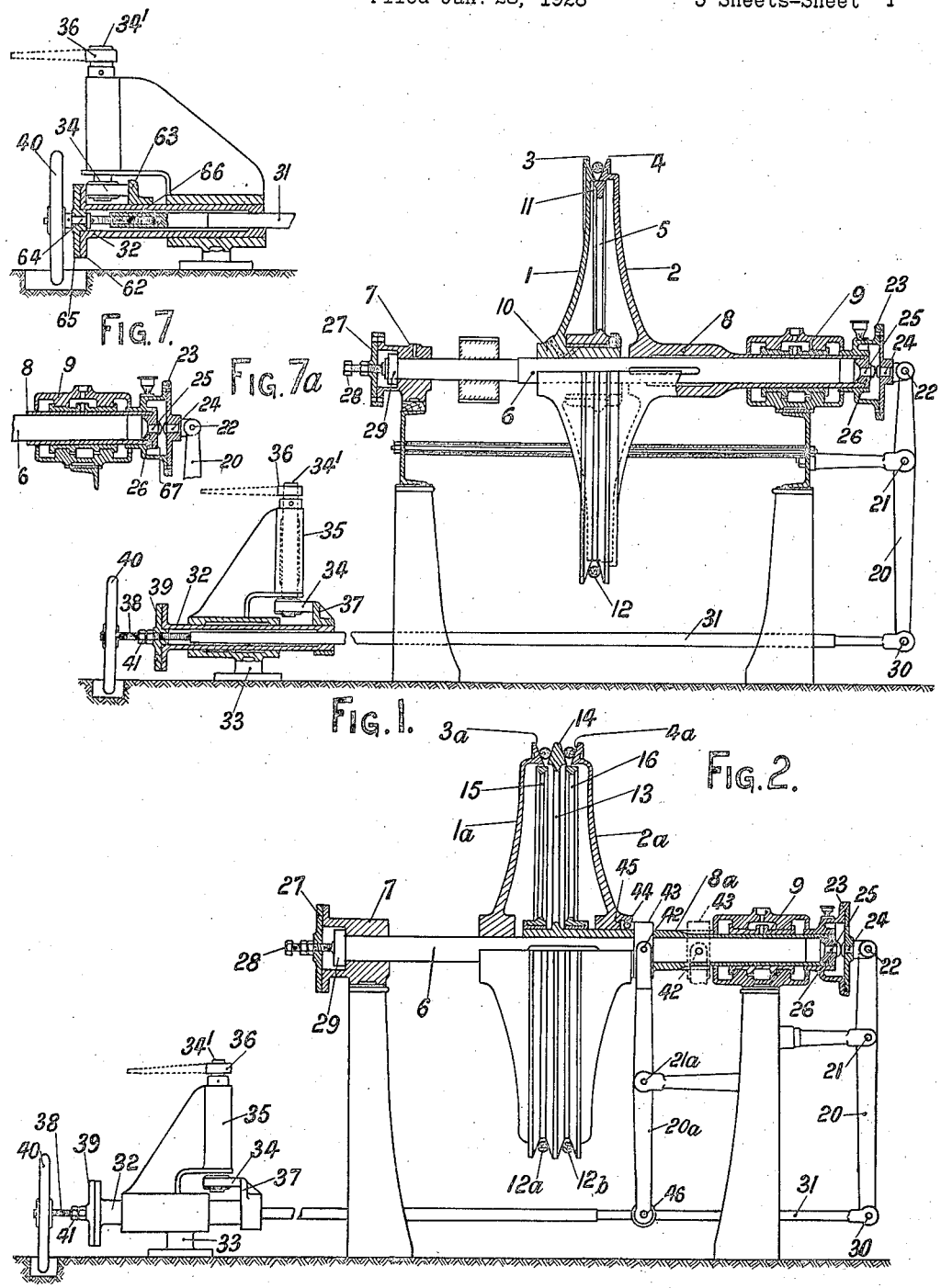

Sept. 4, 1928.  
J. WHITE  
1,683,374  
DRIVING MECHANISM FOR PAPER AND OTHER MACHINES  
Filed Jan. 28, 1928  3 Sheets-Sheet 2
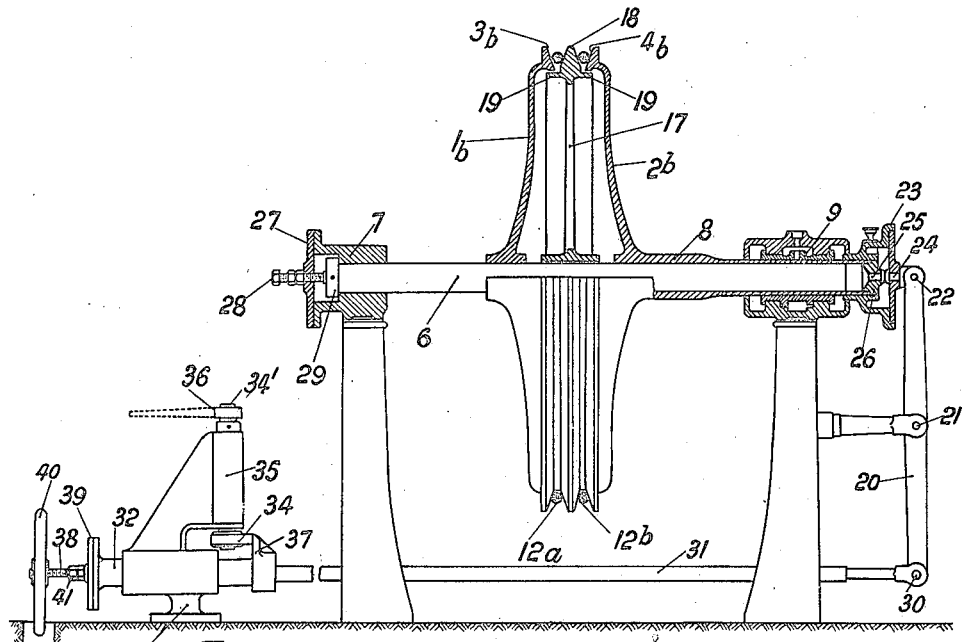
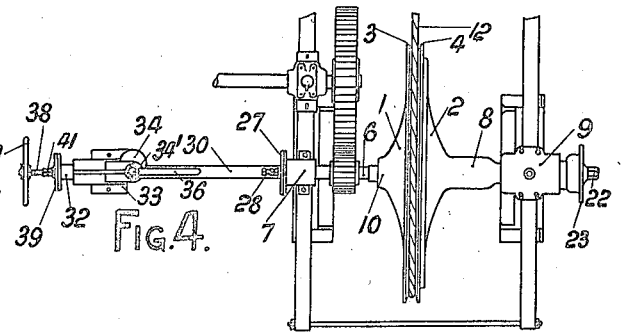
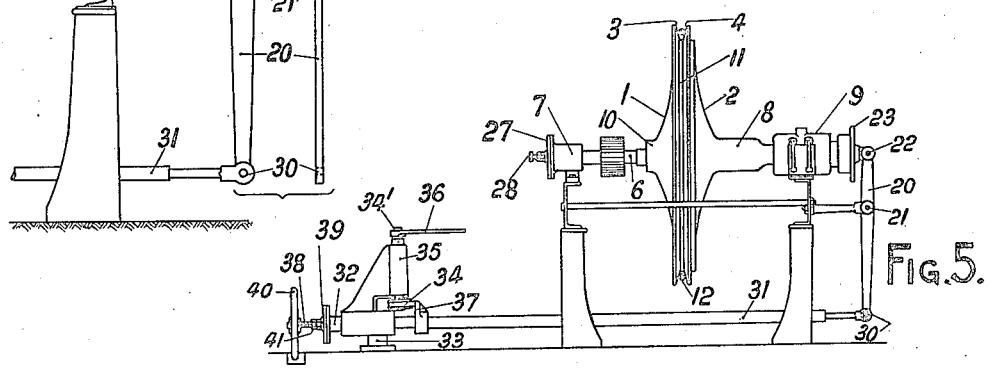
Inventor  
John White  
By  
Pennie, Davis, Marvin & Edmonds  
Attorneys Sept. 4, 1928. 1,683,374
J. WHITE
DRIVING MECHANISM FOR PAPER AND OTHER MACHINES
Filed Jan. 28, 1928 3 Sheets-Sheet 3
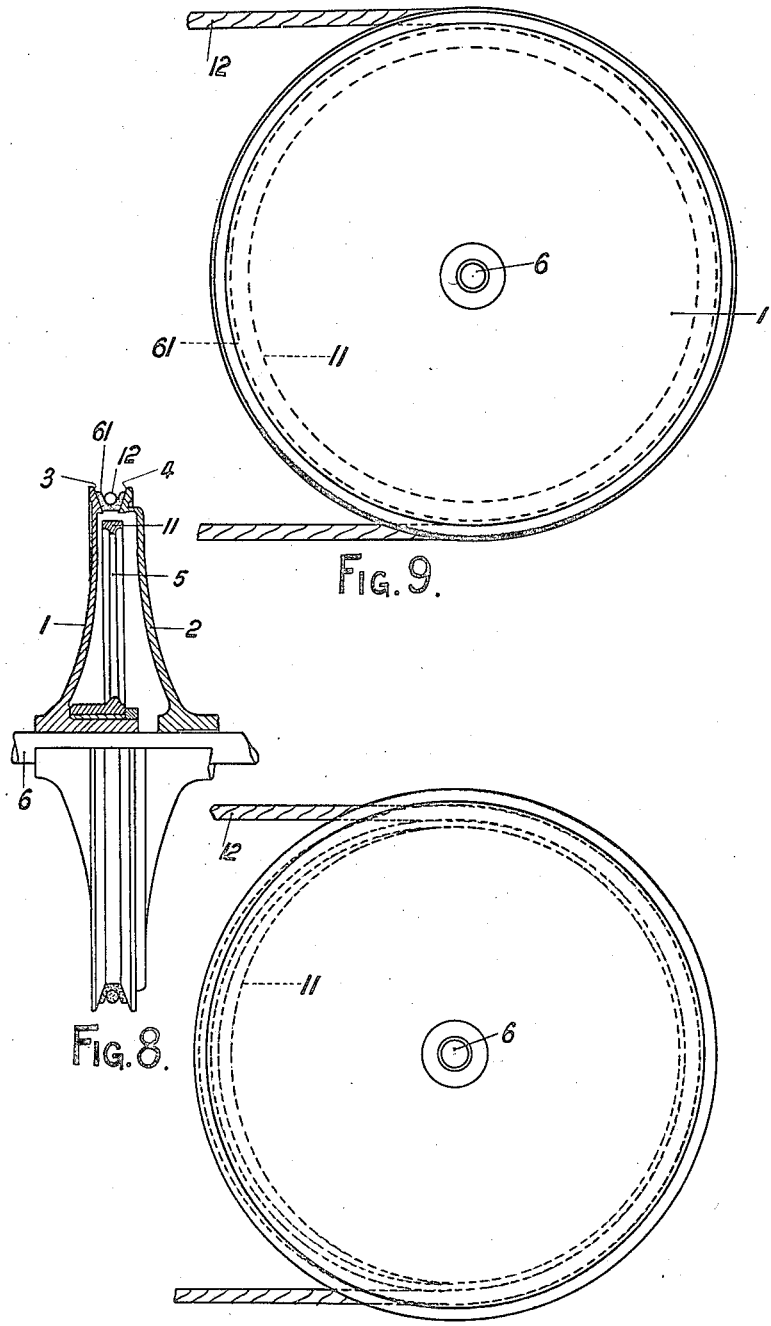

Patented Sept. 4, 1928.

1,683,374

UNITED STATES PATENT OFFICE.

JOHN WHITE, OF EDINBURGH, SCOTLAND.

DRIVING MECHANISM FOR PAPER AND OTHER MACHINES.

Application filed January 28, 1928, Serial No. 250,161, and in Great Britain February 2, 1927.

The subject of this invention is a driving mechanism for paper making and like machines including as a component an expansion pulley, associated with means contrived to resist wedging action of a rope, flexible transmission means or other driving element, which tends to separate the parts of the pulley, and with means to control the wedging action of the driving element so that the pulley will retain any required position between the maxiumm and minimum diameters, so contrived that, when the expanding pulley is again put into action after having been thrown out of action the driving element shall automatically return to exactly the same position in the groove of the pulley as it occupied before.

In the accompanying drawings Fig. 1 is a part elevation, part section, of an expansion pulley equipped with one form of operating mechanism designed for use with a single rope; Fig. 2 a view similar to Fig. 1 showing a duplex expansion pulley for use with two ropes; Fig. 3 a similar view showing a modified form of duplex pulley; Fig. 4 is a plan view of an arrangement of a driving unit in which a single rope pulley is used; Fig. 5 an end elevation of the pulley shown in Fig. 4; Fig. 6 is a fragmentary elevation, part section, showing an alternative form of mechanism for controlling the operation of a pulley; Fig. 7 shows yet another means for controlling the operation of a pulley; Fig. 7$^a$ is a fragmentary section of a thrust block for use in conjunction with the operating mechanism illustrated in Fig. 7; Fig. 8 is an elevation, part section, of a single rope pulley in which a transmission element is interposed between the rope and the pulley rims; Figs. 9 and 10 are views at right angles to Fig. 8.

The construction shown in Figs. 1, 4 and 5 comprises half-pulleys 1, 2 having bevelled rims 3, 4 and embracing between them an idle pulley 5. The half-pulley 1 is keyed fast on a spindle 6 journalled at one end in a bearing 7 while the half-pulley 2 is unitary with a sleeve 8 feathered on the spindle 6 and free to slide thereon. The outer end of the sleeve 8 is journalled in a bearing 9. The idle pulley 5 is revolubly mounted on the boss 10 of the half-pulley 1, the rim 11 of the idle pulley being located at the inner peripheries of the bevelled rims 3, 4.

When it is desired to arrest the spindle 6, the half-pulley 2 is allowed to recede from the half-pulley 1 until the flexible transmission means constituted by the driving rope 12 rests on the rim 11 of the idle pulley 5, the pulley 5 being free to revolve on the boss 10 of the half-pulley 1.

In the modification shown in Fig. 2 there is interposed between the half-pulleys 1$^a$, 2$^a$ a diaphragm 13 presenting a double bevelled rim 14 defining with the rims 3$^a$, 4$^a$ rope-receiving grooves. The diaphragm 13 is unitary with a sleeve 8$^a$ feathered on the spindle 6 and free to slide thereon. The half-pulley 1$^a$ is keyed to the spindle 6 while the half-pulley 2$^a$ is feathered on the sleeve 8$^a$ and is free to slide thereon. Idle pulleys 15, 16 are revolubly mounted on the sleeve 8$^a$, one on each side of the diaphragm 13. When it is desired to arrest the spindle 6, the diaphragm 13 and therewith the idle pulleys 15, 16 and the half-pulley 2$^a$ are allowed to recede from the half-pulley 1$^a$ until the driving ropes 12$^a$, 12$^b$ ride freely on the idle pulleys 15, 16.

In the form shown in Fig. 3 there is located between the half-pulleys 1$^b$ and 2$^b$ so as to be revoluble and axially movable on the spindle 6 an idle pulley 17 having a double bevelled rim 18 projecting between the bevelled rims 3$^b$, 4$^b$ of the half-pulleys and having a lateral rope-receiving flange 19 extending from each side of the rim. When it is desired to arrest the spindle 6, the half-pulley 2$^b$ is allowed to recede from the half-pulley 1$^b$ thereby allowing the idle pulley 17 to recede from the half-pulley 1$^b$ and to rotate freely with the driving ropes 12$^a$, 12$^b$ wrapping the latteral flanges 19 thereof.

The pulley-controlling mechanism shown in Figs. 1, 2, 3, 4 and 5 includes a lever 20 fulcrumed at 21. The upper arm of the lever 20 is pivotally connected at 22 to thrust-receiving means including a thrust block casing 23 freely mounted on the outer end of the sleeve 8 and carrying a hard metal pin 24 the operative face of which bears on the operative face of a hard metal pin 25 fixed in a plug 26 secured to the outer end of the sleeve 8 and revoluble therewith.

The outer end of the bearing 7 is closed by a cover 27 penetrated by a screw-threaded pin 28 of which the inner end bears on the adjacent end of the spindle 6. The spindle 6 is fitted with a collar 29 engaging a shoulder on the bearing 7. The pin 28 and the shoulder function as thrust bearings preventing axial movement of the spindle 6. The lower arm of the lever 20 is pivotally connected at 30 to a rod 31 extending to the front of the machine where it is sleeved by a non-rotary bush 32 slidably mounted in a guide bracket 33. Longitudinal travel of the bush 32 in the guide bracket 33 is controlled by a cam 34 fixed to a spindle 34′ rotatably mounted in a vertical boss 35 integral with the bracket 33 and operable by means of a lever 36. A stop 37 secured to the bush 32 engages the face of the cam 34, the combined bush and stop functioning as a cam-follower. Longitudinal travel of the rod 31 in the bush 32 is controlled by relatively adjustable elements in screw-threaded relationship including a screw 38 screw-threaded through a cover 39 fitted on the bush 32 and an operating handwheel 40 and lock nuts 41 are fitted on the screw 38.

In operation, one half revolution of the cam 34 effected by operation of the lever 36 is sufficient to permit shift of the pulley from the position of maximum diameter of the position in which the rope or ropes runs or run on the idle-pulley or pulleys. When it is desired to restart the section, the handle 36 is moved through half a revolution and the rope or ropes is or are lifted off the idle pulley or pulleys and permitted to exercise frictional action on the rims of the half-pulleys to bring the pulley into action. When the expanding pulley is in motion the position of the rope or ropes in the groove or grooves of the pulley, viz:—between maximum and minimum diameter, is regulated by the handwheel 40 which actuates the screw 38 bearing against one end of the rod 31, the wedging action of the rope or ropes in the groove or grooves of the pulley keeping that end of the rod 31 in close contact with the end of the screw 38.

It will be seen that the starting and stopping gear actuated by the handle 36 is independent of the gear actuated by the handwheel 40 which regulates the position of the rope or ropes in the pulley, and that, regardless of the position occupied by the rope or ropes in the groove or grooves of the pulley when the relative section is brought to rest, the rope or ropes returns or return to exactly the same position when the section is again put in gear.

In the duplex pulley shown in Fig. 2 the movement of the diaphragm 13 and the idle pulleys 15, 16 is controlled by the lever 20, the diaphragm and idle pulleys being in this case movable with the sleeve 8ª while the half-pulley 2ª which is slidably mounted on the sleeve 8ª is operated by a lever 20ª fulcrumed at 21ª. The upper bifurcated end of the lever 20ª is pivotally connected at 42 to a thrust collar 43 embracing the sleeve 8ª and bearing against a ball thrust bearing 44 located in a recess 45 formed in the boss of the half-pulley 2ª. The lower arm of the lever 20ª is pivotally connected at 46 to the rod 31, the arrangement being such that, when it is desired to arrest the spindle 6, the half-pulley 2ª and the idle pulley 15, 16 with the diaphragm 13 are allowed to recede from the half-pulley 1ª until the driving ropes wrap the idle pulleys which are free to revolve on the sleeve 8ª.

Fig. 6 shows an arrangement for controlling the operation of the pulley from the back of the machine, there being interposed between the upper end of the lever 20 and the thrust block casing 23 a handwheel 47 in screw-threaded engagement with a screw 48 fixed in the casing cover 49, the inner end of the screw 48 abutting against the hard metal pin 25 in the plug 26. The outer polygonal end 50 of the screw 48 is engaged by the bifurcated upper end 51 of the lever 20, the inner face of the upper end 51 bearing against the handwheel 47.

On rotation of the handwheel 47, the sliding half-pulley is allowed to recede from or is caused to move towards the fixed half-pulley as before.

Figs. 7 and 7ª show yet another method of mechanism for controlling the operation of a pulley in which the sliding half of the pulley is not only forced into gear by the cam 34 but also is moved out of gear by the cam. In the constructions already described the pressure exerted by the rope on the sliding half-pulley moves the said half-pulley sufficiently far away from the fixed half-pulley so as to allow the driving rope to wrap the idle pulley.

As shown, the cam 34 is interposed between the flange 62 of the bush 32 and a stop 63 secured to the bush, the arrangement being such that the cam 34 controls the sliding motion of the bush in both directions. The handwheel 40 is secured to a spindle 64 journalled and axially located in the bush end cover 65, the inner end 66 of the spindle 64 being screw-threaded into the rod 31.

As shown in Fig. 7ª, the plug 26 in the end of the sleeve 8 is formed with a shoulder 67 engaging one end face of the boss of the thrust block casing 23 so that sliding movement may be imparted in both directions to the sliding half-pulley.

Figs. 8, 9 and 10 show an expanding pulley in which a flexible grooved transmission element 61 is interposed between the driving rope 12 and the bevelled rims 3, 4 of the half-pulleys 1, 2. When the pulley is in operation in maximum diameter driving position as shown in Fig. 8 the flexible element 61 is truly circular as shown in dotted lines in Fig. 9 but as the pulley moves towards inoperative position the flexible element becomes distorted as shown in dotted lines in Fig. 10 and ultimately rides on the rim 11 of the idle pulley 5.

It will be understood that flexible transmission elements as described above may be incorporated in a multiple rope expanding pulley and, in cases where a belt drive is used, the flexible transmission element may present a flat outer face for engagement with the belt.

I claim:—

1. Driving mechanism for paper-making and like machines comprising an expansion pulley constituted by axially separable cone pulley portions, at least one idle pulley embraced by said pulley portions, thrust-receiving means tending to resist axial separating movement of said pulley portions, adjustable means for determining the axial spacing of said pulley portions, and a controlling device for said thrust receiving means, said controlling device operable manually to permit relative movement apart of said pulley portions away from a position determined by the setting of said adjustable means, to interrupt transmission of the drive through said expansion pulley, and to effect relative return movement of said pulley portions to exactly the same determined position.

2. Driving mechanism for paper-making and like machines comprising an expansion pulley constituted by axially separable cone pulley portions, at least one idle pulley embraced by said pulley portions, thrust-receiving means tending to resist axial separating movement of said pulley portions, means including relatively adjustable elements in screw-threaded relationship for determining the axial spacing of said pulley portions, and a device including a cam and a cam-follower for controlling said thrust receiving means, said cam being operable manually to permit relative movement apart of said pulley portions away from a position determined by the setting of said adjustable means, to interrupt transmission of the drive through said expansion pulley, and to effect relative return movement of said pulley portions to exactly the same determined position.

3. Driving mechanism for paper-making and like machines comprising an expansion pulley constituted by axially separable cone pulley portions, at least one idle pulley embraced by said pulley portions, thrust-receiving means tending to resist axial separating movement of said pulley portions, adjustable means for determining the axial spacing of said pulley portions, said means including a lever acting on said thrust-receiving means, a rod connected to said lever, and a cam-follower in screw-threaded relationship with and adjustable axially of said rod, and a controlling device for said thrust receiving means, said controlling device including a cam operable manually to permit relative movement apart of said pulley portions away from a position determined by the setting of said adjustable means, to interrupt transmission of the drive through said expansion pulley, and to effect relative return movement of said pulley portions to exactly the same determined position.

In testimony whereof I have signed my name to this specification.

JOHN WHITE.